(12) United States Patent
Kawano et al.

(10) Patent No.: US 8,564,854 B2
(45) Date of Patent: Oct. 22, 2013

(54) LIGHT GUIDE BODY, AND LIGHTING APPARATUS AND DOCUMENT SCANNING APPARATUS HAVING THE SAME

(75) Inventors: Yuuzou Kawano, Fukuoka (JP); Kohei Suyama, Fukuoka (JP); Takafumi Sanada, Fukuoka (JP)

(73) Assignee: Panasonic Corporation, Osaka (JP)

( * ) Notice: Subject to any disclaimer, the term of this patent is extended or adjusted under 35 U.S.C. 154(b) by 331 days.

(21) Appl. No.: 13/085,924

(22) Filed: Apr. 13, 2011

(65) Prior Publication Data

US 2011/0267659 A1    Nov. 3, 2011

(30) Foreign Application Priority Data

Apr. 28, 2010 (JP) ................................. 2010-102908

(51) Int. Cl.
*H04N 1/04* (2006.01)

(52) U.S. Cl.
USPC ............ 358/475; 358/474; 358/497; 358/498

(58) Field of Classification Search
USPC .................. 358/475, 474, 497, 498
See application file for complete search history.

(56) References Cited

U.S. PATENT DOCUMENTS

| 2009/0207344 | A1* | 8/2009 | Ono et al. ........................ 349/65 |
| 2011/0002142 | A1* | 1/2011 | Yuuki et al. .................. 362/606 |
| 2011/0085212 | A1 | 4/2011 | Sanada et al. |

FOREIGN PATENT DOCUMENTS

| JP | 10-293304 | 11/1998 |
| JP | 2005-204329 | 7/2005 |

OTHER PUBLICATIONS

U.S. Appl. No. 13/114,161 to Takafumi Sanada et al., which was filed May 24, 2011.

\* cited by examiner

*Primary Examiner* — Houshang Safaipour
(74) *Attorney, Agent, or Firm* — Greenblum & Bernstein P.L.C.

(57) ABSTRACT

Top surfaces and inclined surfaces of prisms on a side opposite to a light source are formed such that, in a region on a light source side, light traveling in a light guide body toward the side opposite to the light source is sequentially reflected by the top surfaces and the inclined surfaces of the side opposite to the light surface of the prisms and approaches a direction orthogonal to the longitudinal direction of the light guide body. The height of the prisms can be the lowest in the longitudinally central portion of the light guide body, and gradually increases toward the light source side and the side opposite to the light source, from the central portion.

17 Claims, 14 Drawing Sheets

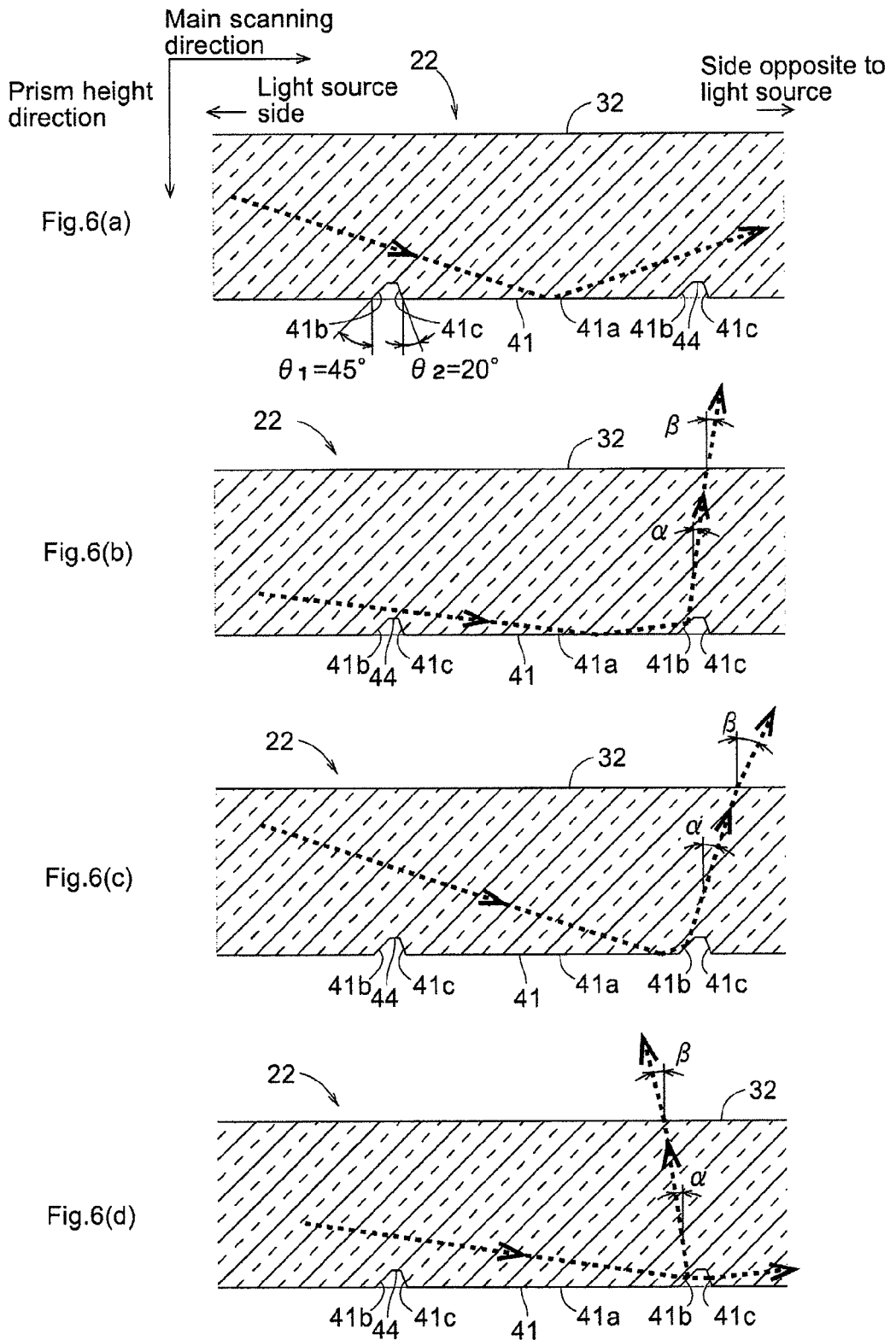

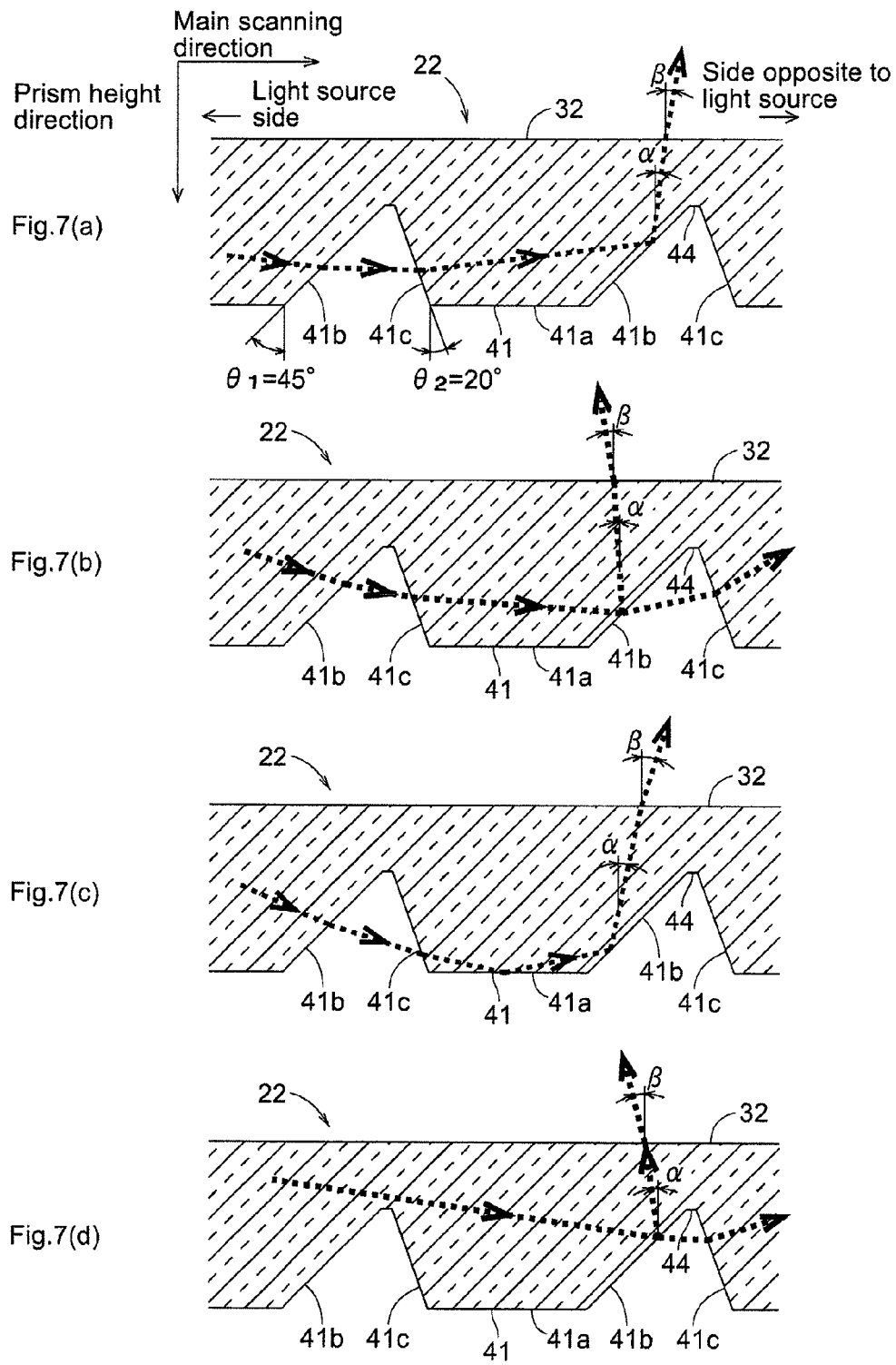

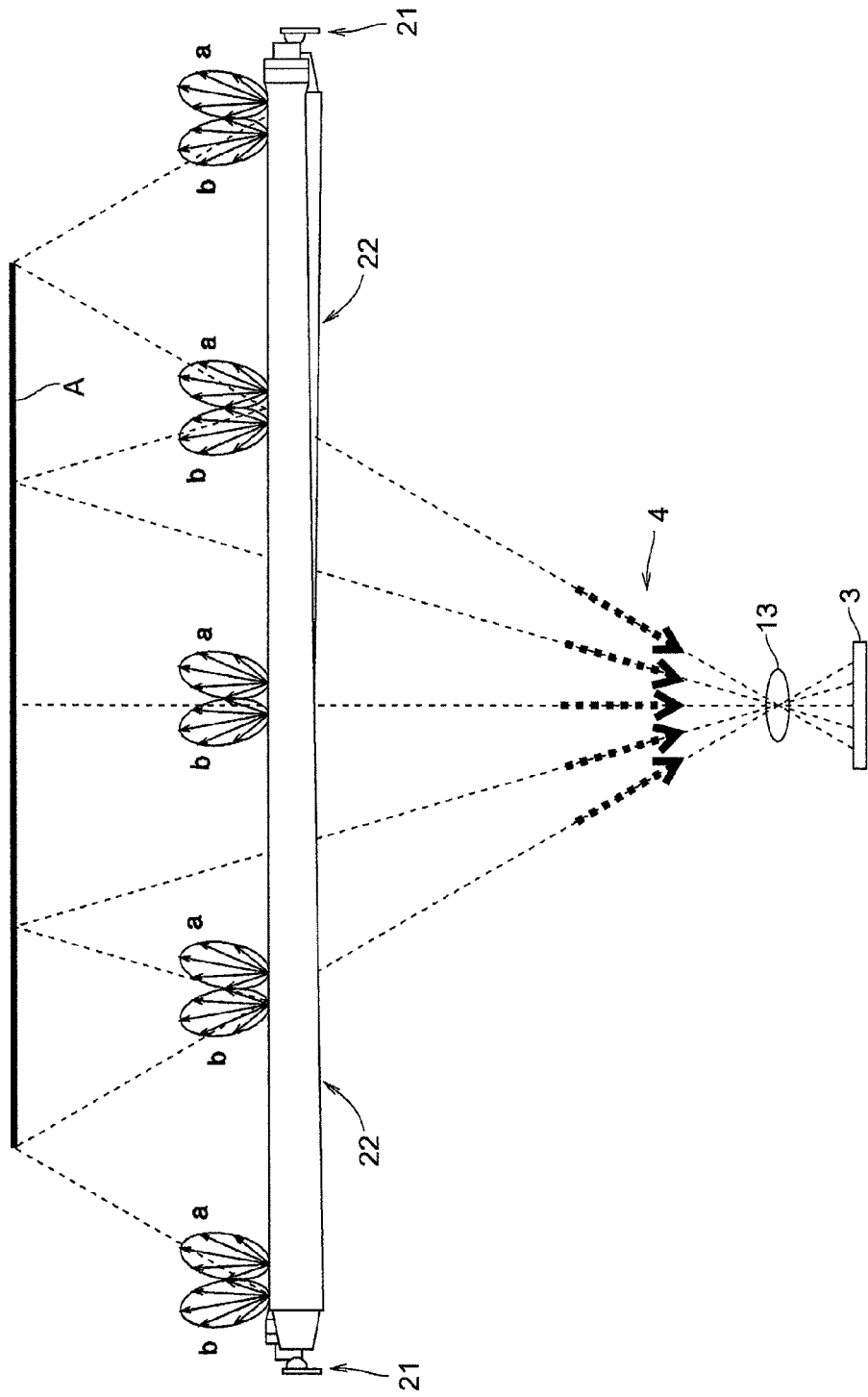

Illumination Distribution on Scanned Surface of Document

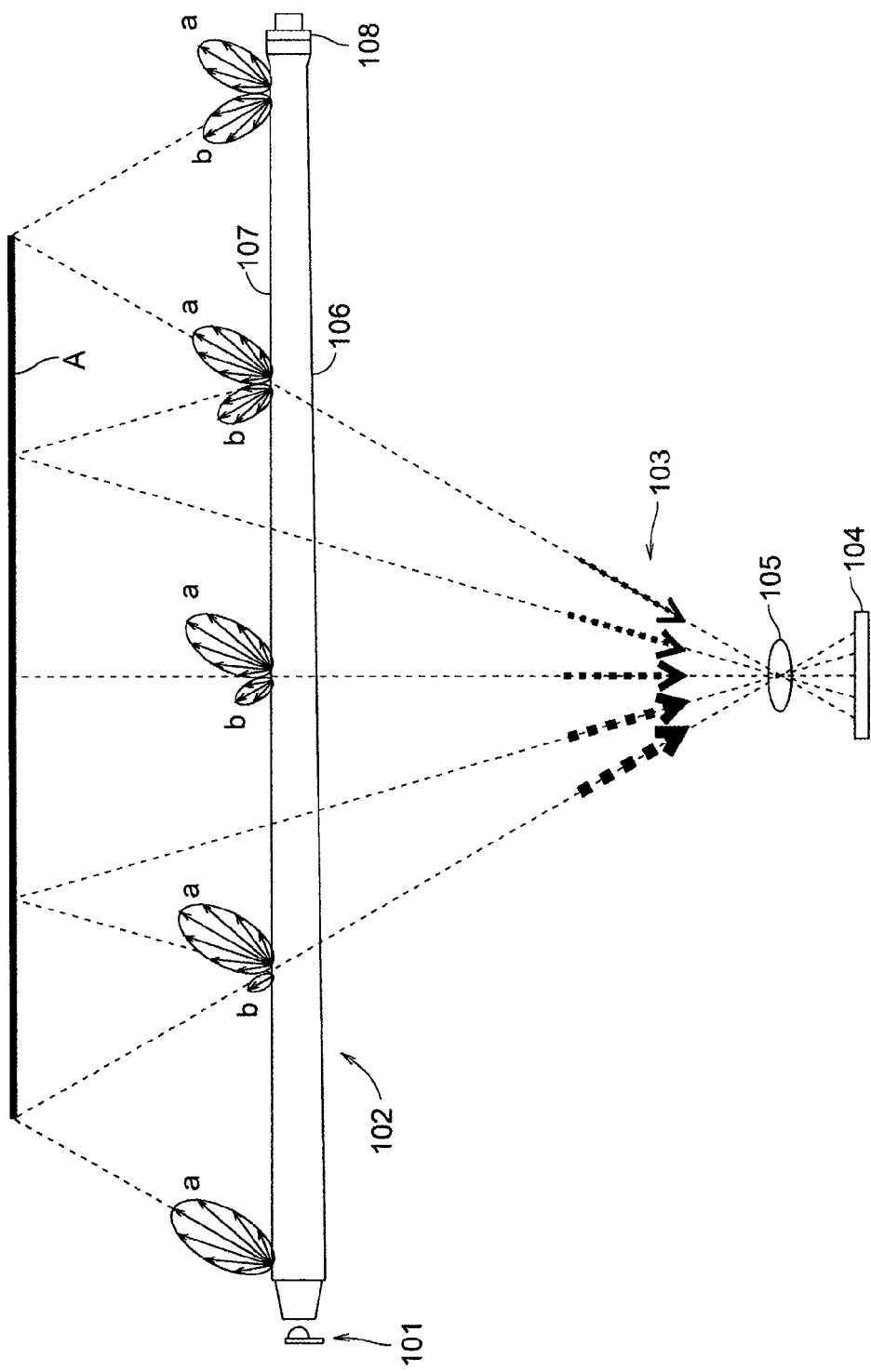

LIGHT GUIDE BODY, AND LIGHTING APPARATUS AND DOCUMENT SCANNING APPARATUS HAVING THE SAME

CROSS-REFERENCE TO RELATED APPLICATIONS

The present application claims priority under 35 U.S.C. §119 of Japanese Application No. 2010-102908 filed on Apr. 28, 2010, the disclosure of which is expressly incorporated by reference herein in its entirety.

BACKGROUND OF THE INVENTION

1. Field of the Invention

The present invention relates to a light guide body having a prism formed surface longitudinally arrayed with a plurality of prisms and provided opposite to a light emitting surface, in order to allow light emitted from a light source to enter a light incident surface on a longitudinal end side and to emit from the longitudinally extending light emitting surface. The present invention also relates to a lighting apparatus and a document scanning apparatus that have the light guide body.

2. Description of Related Art

In a document scanning apparatus that scans an image on a scanned surface of a document, a light receiving element, such as a line CCD and the like, receives reflected light from a document surface illuminated with a lighting apparatus, and outputs an image signal. The lighting apparatus of the document scanner conventionally uses a fluorescent tube in general. In view of energy saving, however, a light source using an LED has recently become widespread.

Such a lighting apparatus using an LED as a light source has a configuration in which a light guide body extending along an entire width of a scanned area is used to guide light emitted from an LED light source to a document surface. In order to allow the light emitted from the light source to enter a light incident surface on a longitudinal end side and to be emitted from a longitudinally extending light emitting surface, the light guide body is provided with a prism formed surface on which a plurality of projecting prisms are arrayed in the longitudinal direction of the light guide body (refer to Related Art 1).

As a surface light source apparatus, a light guide body is disclosed having a substantially a triangular prism in a projecting shape on a surface opposite to a light incident surface (refer to Related Art 2).

In the lighting apparatus having such a configuration of the light guide body, commonly-called black floating may occur, in which an area of high brightness appears in a black-colored document surface. It is desired to prevent black floating in order to increase the quality of a scanned image.

FIG. 14 is a schematic view illustrating a state of light emission from a light guide body and light intensity in an optical reduction system in a conventional lighting apparatus. Light emitted from a light source 101 enters a light guide body 102. The light emitted from the light guide body 102 is radiated onto a document A. The reflected light from the document A is guided to a scanning sensor 104 through an optical reduction system 103. In the optical reduction system 103, the reflected light from the document A is reduced in a main scanning direction by a lens 105 so as to fit a width of a scanning sensor 104. Of the reflected light from the document A, only the light having a specific angle corresponding to the field angle of the lens 105 enters the scanning sensor 104.

In the light guide body 102, meanwhile, the light from the light source 101 entering the light guide body 102 and traveling toward the side opposite to the light source is reflected by a prism formed surface 106 and is emitted from a light emitting surface 107 (indicated with "a" in the drawing). Further, the light reflected by a mirror 108 provided to an end portion of the side opposite to the light source of the light guiding boy 102 and traveling in the light guide body 102 toward the light source side is reflected by the prism formed surface 106 and is emitted from the light emitting surface 107 (indicated with "b" in the drawing). The sum of the two lights emitted from the light guide body 102 has directivity.

In a region on the light source side in particular, the light emitted from the light guide body 102 has directivity in a direction inclined toward the side opposite to the light source as a main axis, relative to the direction orthogonal to the longitudinal direction (main scanning direction) of the light guide body 102. The intensity of the light in the main axis direction is the highest. Since the light in the main axis direction substantially coincides with the field angle of the lens 105, however, light receiving intensity is high on a light receiving surface of the scanning sensor 104. Meanwhile, toward the side opposite to the light source, the main axis direction of the emitted light shifts gradually to the direction orthogonal to the main scanning direction and the field angle of the lens 105 rapidly changes to a direction inclined toward the side on the light source. So, a difference between the main axis direction of the emitted light and the field angle of the lens 105 is greater toward the side opposite to the light source. Thus, the light receiving intensity on the light receiving surface of the scanning sensor 104 gradually decreases. The density in a scanned image then changes, thus causing black floating in which the scanned image looks pale on the light source side.

[Related Art 1] Japanese Patent Laid-Open Publication No. 2005-204329

[Related Art 2] Japanese Patent Laid-Open Publication No. H10-293304

SUMMARY OF THE INVENTION

The present invention is provided to address the above-described circumstances in the conventional technologies. The objective of the present invention is to provide a light guide body configured to reduce black floating. The present invention also provides a lighting apparatus and a document scanning apparatus having the light guide body.

A light guide body according to the present invention includes a prism formed surface provided opposite to a light emitting surface and having a longitudinally extending array of a plurality of prisms to allow light emitted from a light source to enter an end side of a light incident surface of the light guide body in the longitudinal direction and to be emitted from the longitudinally extending light emitting surface. The top surfaces and inclined surfaces of the prisms on a side opposite to the light source are configured, such that in a region of the light guide body on a light source side, the light traveling to the side opposite to the light source in the light guide body is sequentially reflected by the top surfaces and the inclined surfaces on the side opposite to the light source of the prisms, and is emitted from the light emitting surface in a direction that approaches a direction orthogonal to the longitudinal direction of the light guide body.

According to the present invention, the light emitted from the light guide body has directivity in a direction substantially orthogonal to the longitudinal direction of the light guide body as a main axis direction. In a region on the light source side, the light intensity is low in a direction coinciding with a field angle of lenses included in the optical reduction system, and thus black floating can be reduced.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 6(a) to 6(d) are schematic views illustrating a state of light travel in a region on the light source side of the light guide body shown in FIG. 3;

FIGS. 7(a) to 7(d) are schematic views illustrating a state of light travel in a region on the side opposite to the light source of the light guide body shown in FIG. 3;

FIG. 12 is a schematic view illustrating a state of light emission from a light guide body and light intensity of an optical reduction system in the lighting apparatus shown in FIG. 11;

FIG. 14 is a schematic view illustrating a state of light emission from a light guide body and light intensity of an optical reduction system in a conventional lighting apparatus.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Embodiments of the present invention are explained below with reference to the drawings.

Figure 1:
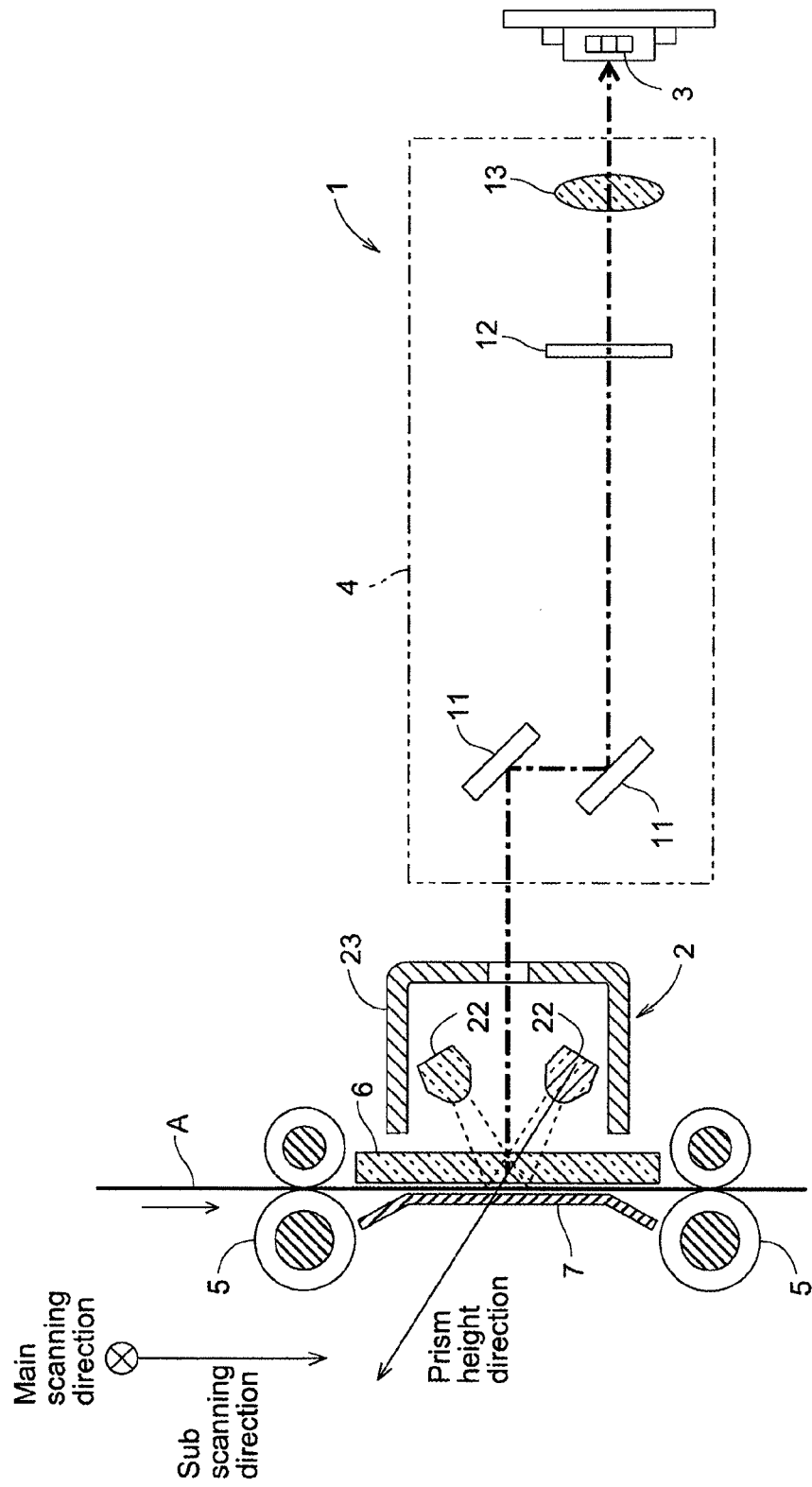
FIG. 1 is a schematic view of a document scanning apparatus to which the present invention is applied.

FIG. 1 is a schematic view of a document scanning apparatus to which the present invention is applied. The document scanning apparatus 1 has a lighting apparatus 2, a scanning sensor 3, and an optical reduction system 4. The lighting apparatus 2 extends in a main scanning direction in order to illuminate a document A. The scanning sensor 3 receives light reflected from the scanned surface of the document A and outputs an image signal. The optical reduction system 4 guides the reflected light from the scanned surface of the document A to the scanning sensor 3.

In the explanations below, the direction in which the lighting apparatus 2 extends (also the longitudinal direction of the lighting apparatus 2, as hereinafter described) may be referred to as the main scanning direction; and the direction in which the document A moves relative to the lighting apparatus 2 may be referred to as a sub scanning direction.

In the scanning sensor 3, light receiving elements (CCD) converting light into electric signals are arrayed in the main scanning direction for every RGB color, thus forming a line sensor. The document A is fed between a document glass 6 and a document guide 7 by a feeding roller 5. Feeding the document A allows scanning in the sub scanning direction.

The optical reduction system 4 has a plurality of mirrors 11, a slit 12, and a lens 13. The slit 12 blocks unnecessary light. The lens 13 forms an image from the reflected light of the document A on a light receiving surface of the scanning sensor 3, and reduces the image in the main scanning direction to fit the width of the scanning sensor 3.

Figure 2:
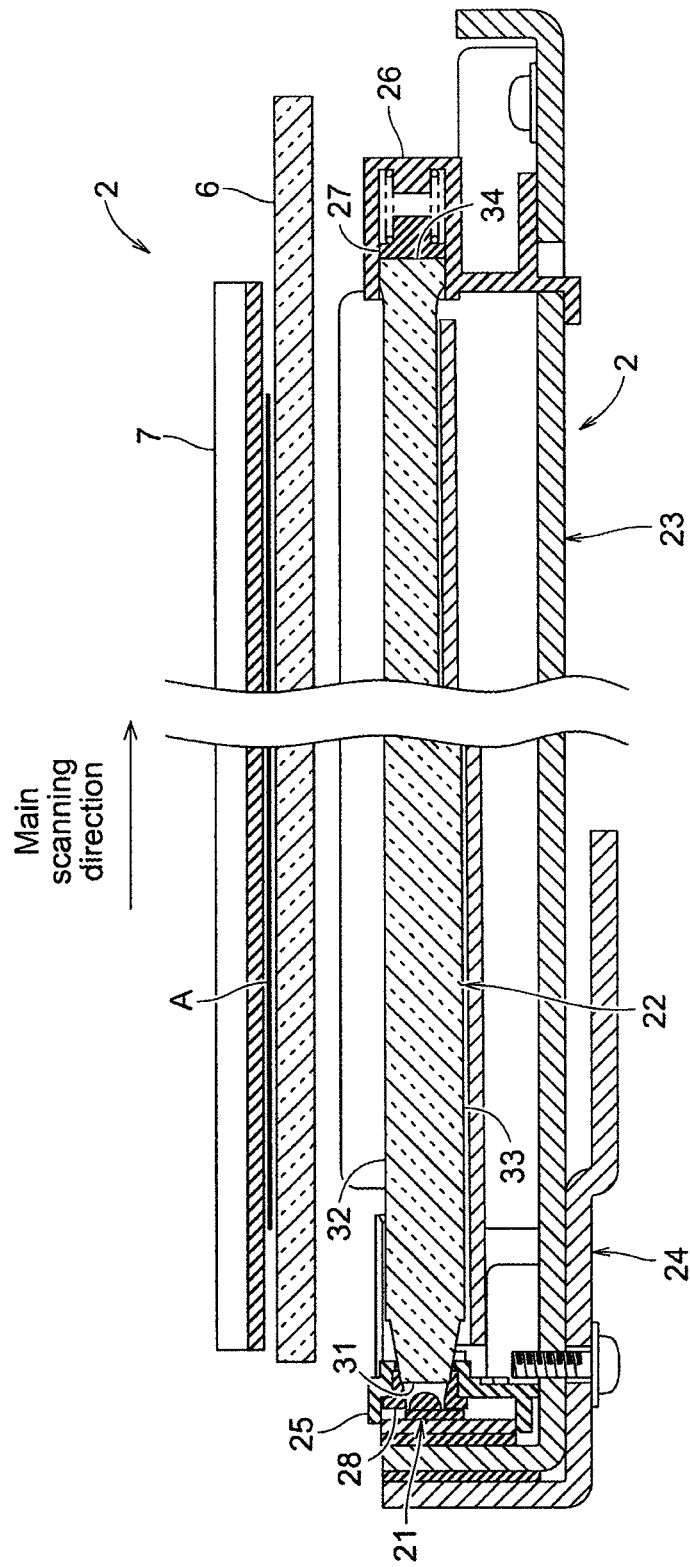
FIG. 2 is a cross-sectional view illustrating a lighting apparatus shown in FIG. 1.

FIG. 2 is a cross-sectional view illustrating the lighting apparatus shown in FIG. 1. The lighting apparatus 2 has a light source 21, a light guide body 22, a case 23, and a heat dissipating body 24. The light guide body 22 guides the light emitted from the light source 21 to the scanned surface of the document A. The case 23 integrally supports the light source 21 and the light guide body 22. The heat dissipating body 24 dissipates the heat generated at the light source 21.

The light source 21 has a ceramic substrate on which an LED chip is provided. A hemispherical lens is provided so as to cover the LED chip. The light source 21 is a commonly called one-chip type white LED. The LED chip emits blue light. The lens is formed of a bonding material, such as transparent silicon, in which a yellow fluorescent substance is dispersed. The blue light emitted from the LED chip is converted to yellow light by the yellow fluorescent substance in the lens. The blue light passing through the lens and the yellow light emitted from the yellow fluorescent substance are then mixed to produce white light.

The light guide body 22 is provided so as to extend along substantially an entire width of a scanned area. The light guide body 22 is provided with a prism formed surface 33 opposite to a light emitting surface 32, the prism formed surface 33 being arrayed with a plurality of prisms in the longitudinal direction of the light guide body 22. The prism formed surface 33 is provided in order to allow the light emitted from the light source 21 to enter an end side of a light incident surface 31 in the longitudinal direction (main scanning direction) and to emit the light from the longitudinally extending light emitting surface 32. The light incident surface 31 is a planar surface. The light emitting surface 32 is a curved surface having an oval cross section in the main scanning direction. The light guide body 22 is formed of a resin material having translucency, such as acrylic resin (PMMA, for example). The light guide body 22 has a tapered shape, in which a cross sectional area is gradually tapered from the light source side to the side opposite to the light source in a portion where the light emitting surface 32 extends.

An end portion on the light source side of the light guide body 22 is held by a first holding member 25; and an end portion on the side opposite to the light source is held by a second holding member 26. A light reflecting body 28 is provided to the end portion on the light source side of the light guide body 22, the light reflecting body 28 guiding the light emitted from the light source 21 to the light incident surface 31 of the light guide body 22. A mirror 27 is housed in the second holding member 26, which holds the end portion on the side opposite to the light source of the light guide body 22, the mirror 27 being contactable with an end surface 34 of the light guide body 22. The mirror 27 is provided with a reflecting surface on the end surface 34 side of the light guide body 22. The light reaching the end surface 34 of the light guide body 22 while being repeatedly refracted and reflected inside the light guide body 22, is reflected by the reflecting surface of the mirror 27 and is returned to the inside of the light guide body 22.

In the embodiment, the light guide body 22 is provided as a pair so as to be oriented in parallel with each other (refer to FIG. 1). Thus, the light source 21 is also provided as a pair corresponding to the two light guiding bodies 22. The pair of light guiding bodies 22 are disposed such that the light source side and the side opposite to the light source are disposed in the same direction. The pair of light sources 21 are also disposed on the same sides.

Figure 3:
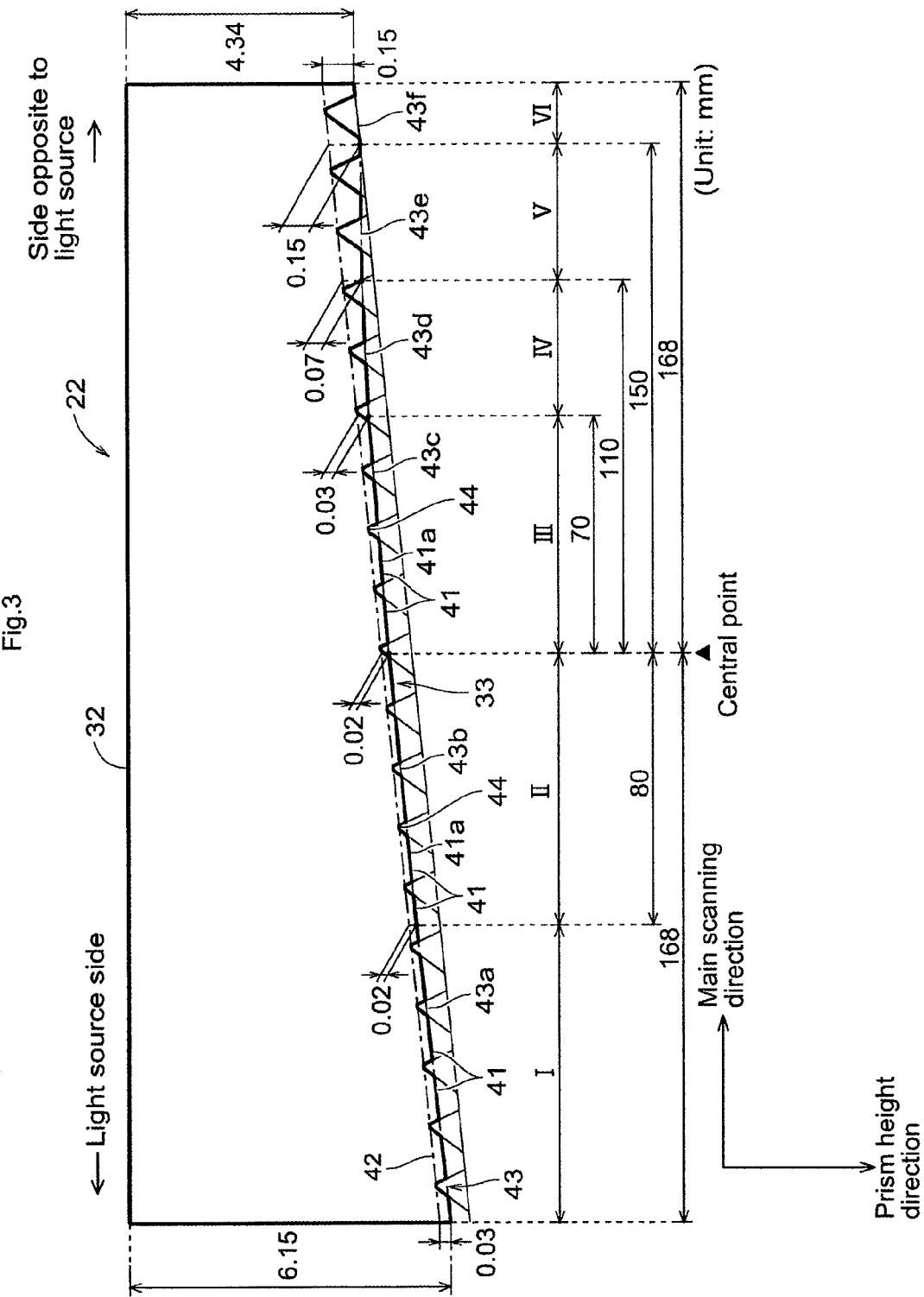
FIG. 3 is a schematic view illustrating a state of prism formation in a light guide body shown in FIG. 1.

FIG. 3 is a schematic view illustrating a formation status of prisms 41 in the light guide body 22 shown in FIG. 1. When a light incident angle to a lens is θ relative to an optical axis in an optical reduction system, it is known that illumination has the following relationship (cosine to the fourth law):

I=I0 cos$^4$ θ, wherein

I0: Illumination of light before incidence

I: Illumination of light after incidence

Each of the prisms 41 has a substantially trapezoidal cross section. In order to change the height of the prisms 41 according to the illumination distribution property required by the cosine to the fourth law, the prism formed surface 33 of the present embodiment is provided such that a trough portion 44 between the prisms 41 is positioned on a first reference surface 42 including one planar surface, and that a top surface 41a of the prisms 41 is positioned on a second reference surface 43, which is disposed such that a distance from the first reference surface 42 changes in the longitudinal direction.

In the embodiment, the distance between the first reference surface 42 and the second reference surface 43 determines the height of the prisms 41, which accordingly determines the reflecting area of the prisms 41, or the light emission amount per unit length from the light emitting surface 32. Thus, appropriately setting the position of the second reference surface 43 relative to the first reference surface 42 provides a predetermined illumination distribution property. Since the height of the prisms 41 adjusts the illumination distribution property, the prisms 41 can be disposed at a constant placement interval between prisms. Thus, problems are solved, including uneven illumination caused by a excessively wide placement interval between the prisms 41, and insufficient irradiation width in the sub scanning direction caused by a excessively narrow width of the prisms 41.

Figure 5A:
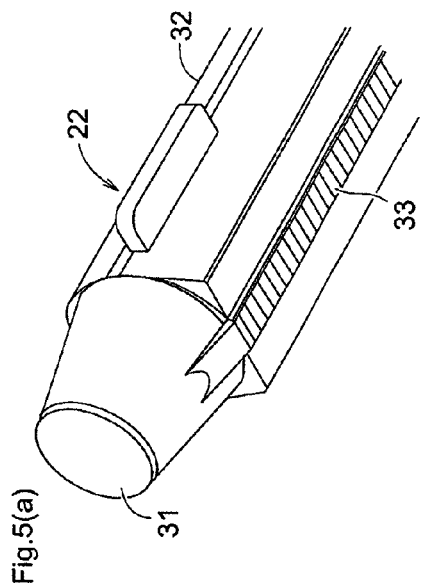
FIGS. 5(a) to 5(d) are perspective views illustrating a light source side and a side opposite to the light source of the light guide body shown in FIG. 3.
Figure 5B:
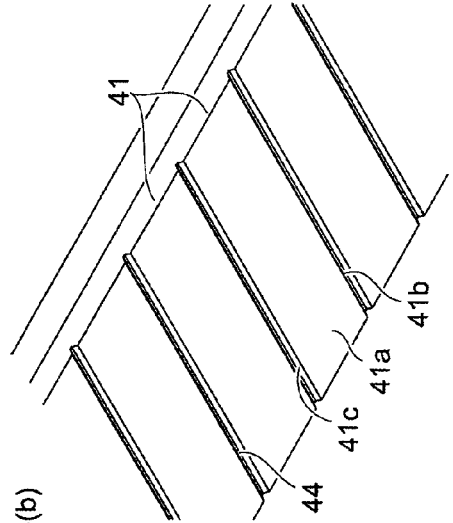
Figure 5C:
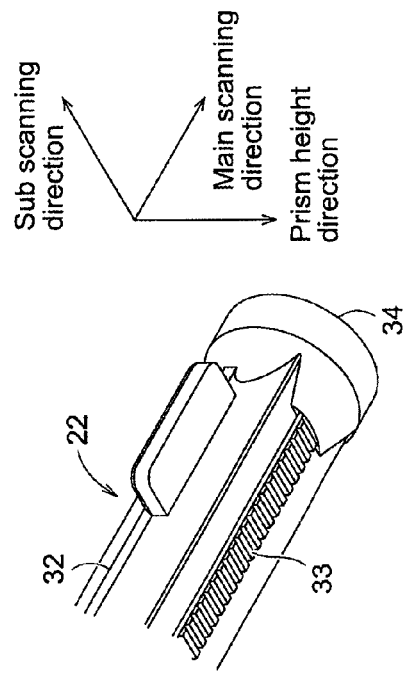
Figure 5D:
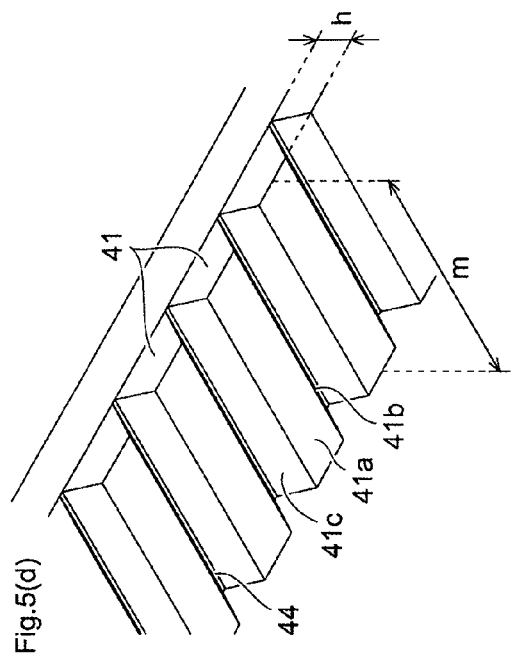

The height (the distance between the first reference surface 42 and the second reference surface 43, referred to "h" in FIG. 5d) of the prisms 41 is constant in the sub scanning direction (along the depth, referred to "m" in FIGS. 5b and 5d) of the light guide body 22. A groove between adjacent prisms 41 also has substantially a trapezoidal cross section. Alternatively, the groove between the prisms 41 may have a triangle cross section.

The second reference surface 43 includes a plurality of (six in the present embodiment) planar surfaces having different inclinations, so as to provide an appropriate illumination distribution property in view of the above-described cosine to the fourth law. Specifically, the second reference surface 43 includes the planar surface 43a provided in a first region I most proximate to the light source side; the planar surface 43b provided in a second region II closer to the light source side than the center point; the planar surface 43c provided in a third region III closer to the side opposite to the light source than the center point; the planar surface 43d provided in a fourth region IV on the side opposite to the light source of the planar surface 43c; the planar surface 43e provided in a fifth region V on the side opposite to the light source of the planar surface 43d; and the planar surface 43f provided in a sixth region VI most proximate to the side opposite to the light source. The respective regions of the planar surfaces have different lengths in the main scanning direction. In view of the attenuation property of the light entering from the light source side and travelling through the light guide body 22, a component reflected from the side opposite to the light source and returning to the light source side, the cosine to the fourth law, and the like, the length of each region is determined such that the illumination distribution in the main scanning direction on the document surface is eventually opposite to the cosine to the fourth distribution (thereby, the cosine to the fourth law, which is the lens property, is offset. A relationship with the cosine to the fourth law will be explained in detail hereinafter). For rigorous requirements, the illumination distribution on the document surface can be adjusted with a higher precision by increasing number of above-described regions provided. However, when the length extending in the longitudinal direction of the light emitting surface of the light guide body 22 (specifically, an effective region required for irradiation of the document surface) is approximately equal to a short side of an A3, A4, letter or legal size sheet, for instance, the above-described six planar surfaces are sufficient.

In the first region I, the planar surface 43a included in the second reference surface 43 is disposed such that the distance from the first reference surface 42 is gradually reduced toward the side opposite to the light source. Thus, the height of the prisms 41 gradually becomes lower toward the side opposite to the light source. In the second region II, the planar surface 43b included in the second reference surface 43 is disposed so as to be in parallel with the first reference surface 42. Thus, the height of the prisms 41 is constant.

In the third region III, the fourth region IV, and the fifth region V, the planar surfaces 43c, 43d, and 43e included in the second reference surface 43 are respectively disposed such that the distance from the first reference surface 42 is gradually increased toward the side opposite to the light source. Thus, the height of the prisms 41 gradually becomes higher toward the side opposite to the light source. Further, the inclination of the planar surfaces 43c, 43d, and 43e is greater sequentially relative to the first reference surface 42. Thus, a change in the height of the prisms 41 is greater sequentially in the third region III, the fourth region IV, and the fifth region V. In the sixth region VI, the planar surface 43f included in the second reference surface 43 is disposed in parallel with the first reference surface 42, and thus the height of the prisms 41 is constant.

Specifically, in the first region I to the sixth region VI, the height of the prisms is the lowest in the longitudinal central portion of the light guide body 22 (the center point shown in FIG. 3), and is gradually higher from the central portion toward the end portions on the light source side and the side opposite to the light source. Further, the placement pitch (i.e., spacing) of the prisms 41 is even in the longitudinal direction in the first region I to the sixth region VI. Thus, regulating the height of the prisms 41 in each region as described above changes the length of the top surface 41a of each prism 41 in the main scanning direction according to the longitudinal position. Specifically, in each position in the longitudinal direction, the length of the top surface 41a of the prism 41 in the main scanning direction is the longest at the longitudinal central portion of the light guide body 22, and is gradually shorter from the central portion toward the end portions on the light source side and the side opposite to the light source.

As clarified in the illustration of FIG. 3, when the "central point" is a reference, the average value of the lengths of the top surfaces 41a of the prisms 41 from the light source side to the central point is V1, and the average value of the lengths of the top surfaces 41a of the prisms 41 from the central point to the side opposite to the light source is V2, the relationship is represented as V1>V2.

The prisms 41 are enlarged compared with an actual size for illustration purposes. The prisms 41 are actually minute having a height of 0.02 mm to 0.15 mm, for example. Such prisms 41 are provided in a large quantity at an even pitch in the main scanning direction (placement interval of 0.46 mm, for instance). The width of the trough portions 44 in the main scanning direction is 0.015 mm, for instance.

When the region in which the prisms 41 are disposed is an effective region of light emission on the light emitting surface 32 (to irradiate a short side of an A4 size), the light guide body 22 of the present embodiment has dimensions of 240 mm in the scanning direction, 6.15 mm in the prism height direction on the light source side, and 4.34 mm in the prism height direction on the side opposite to the light source.

Figure 4A:
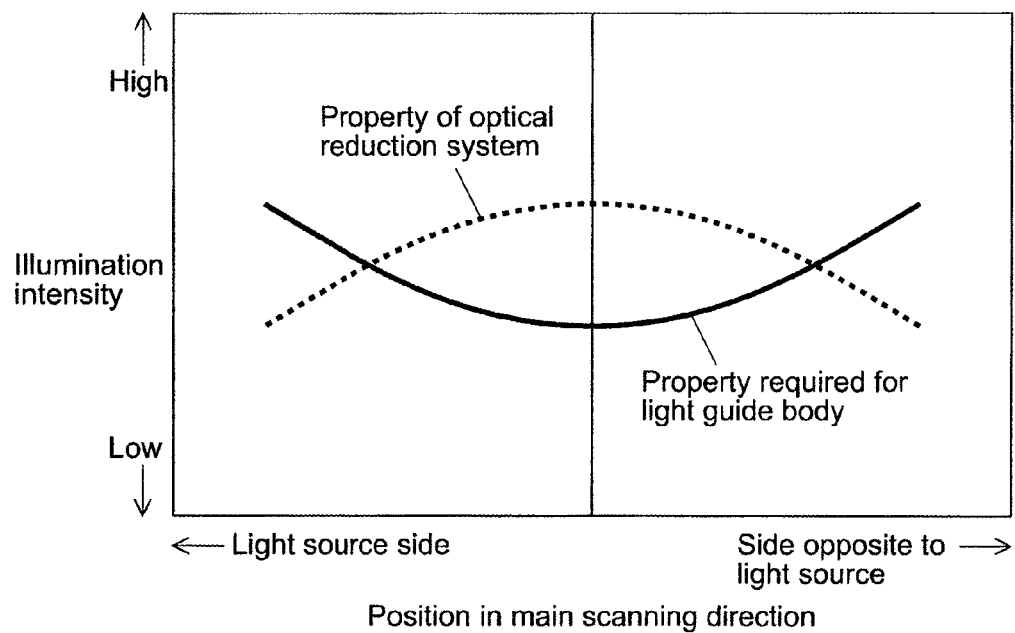
FIGS. 4(a) and 4(b) illustrate properties of the light guide body and the optical reduction system.
Figure 4B:
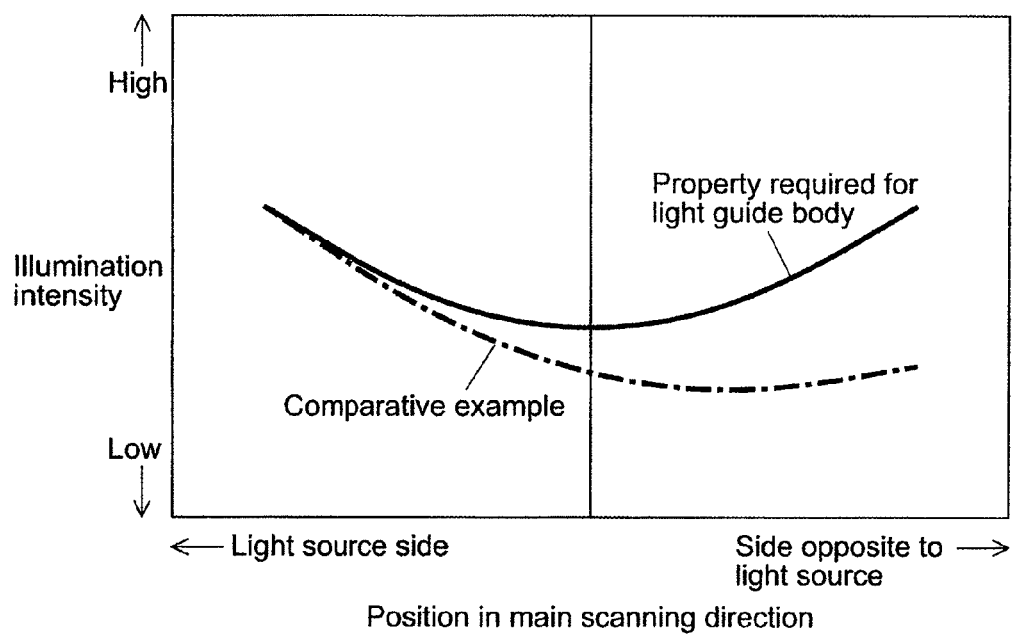

FIGS. 4(a) and 4(b) illustrate the respective properties of the light guide body 22 and the optical reduction system 4. As shown in FIG. 1, the document scanning apparatus 1 employs the optical reduction system 4 in which the lens 13 reduces the reflected light from the scanned surface of the document A in the main scanning direction, so as to fit the width of the scanning sensor 3. In the optical reduction system 4, when the illumination intensity of the light emitted from the light guide body 22 is even in the main scanning direction (longitudinal direction of the light guide body 22), the illumination distribution on the light receiving surface of the scanning sensor 3 demonstrates a property changing in an arcuate shape due to the cosine to the fourth law related to the lens 13. Specifically, the distribution is the highest in the central portion of the main scanning direction, and is gradually lower from the central portion to the end portions, as shown with a broken line in FIG. 4(a). Scanning cannot be performed accurately with such a distribution property.

To overcome the problem, the illumination distribution property of the light guide body 22 is set so as to demonstrate a property opposite to the property of the optical reduction system 4, specifically, a property changing in an arcuate shape opposite to the property of the optical reduction system, in which the distribution is low in the central portion of the main scanning direction and is high on the end portions on the light source side and the side opposite to the light source (a solid line in FIG. 4(a)). In order to achieve this, the area of the prisms per unit length, more specifically, the height of the prisms 41 is set to be the lowest in the central portion and gradually higher from the central portion toward the end portions on the light source side and the side opposite to the light source.

The light guide body 22 is formed of a material excellent in translucency, such as an acrylic resin. Due to light absorption, however, the light attenuation is inverse to the square of the distance from the light source 21. Thus, merely setting the height of the prisms 41 to fit the optical reduction system 4 does not achieve an illumination distribution property suitable for the optical reduction system 4, as shown with the solid line of FIG. 4(b), since the illumination intensity on the scanned surface of the document is high in the region at the light source side and low in the region at the side opposite to the light source, as shown in a comparative example (dashed-dotted line) of FIG. 4(b).

In view of the attenuation amount due to light absorption, the height of the prisms 41 in the present embodiment is set higher in the region at the side opposite to the light source than in the region on the light source side. Specifically, the height of the prisms 41 is higher in the fourth region IV, the fifth region V, and the sixth region VI on the side opposite to the light source than in the first region I on the light source side, as shown in FIG. 3. The height of the prisms 41 is the lowest in the second region II close to the central portion; is gradually higher in the first region I on the light source side toward the end portion on the light source side; and is gradually higher in the third region III, the fourth region IV, and the fifth region V on the side opposite to the light source toward the end portion on the side opposite to the light source.

The arrangement above eliminates the impact of the attenuation due to light absorption. The illumination distribution property suitable for the optical reduction system 4, as shown with a solid line in FIGS. 4(a) and 4(b), is then achieved. Further, the property of the optical reduction system 4 and the property of the light guide body 22 are offset on the light receiving surface of the scanning sensor 3 in which the property of the optical reduction system 4 and the property of the light guide body 22 are combined. Thus, the illumination distribution of the scanning sensor 3 can be uniform along the entire main scanning direction.

An output value error stemming from a difference in the illumination intensity on the light receiving surface of the scanning sensor 3 may be corrected in signal processing (shading compensation). Equalizing the illumination intensity on the light receiving surface of the scanning sensor 3 as described above provides an even bit accuracy of image data in the main scanning direction, thus achieving high-accuracy scanning. Further, unnecessary light does not need to be blocked by the slit 12 of the optical reduction system 4, and thus the light amount from the light source 21 can efficiently be used.

FIGS. 5(a) to 5(d) are perspective views illustrating the light source side and the side opposite to the light source of the light guide body 22 shown in FIG. 3. FIG. 5(a) illustrates the end portion on the light source side of the light guide body 22; FIG. 5(b) is an enlarged view of the prisms 41 on the light source side of the light guide body 22; FIG. 5(c) illustrates the end portion on the side opposite to the light source of the light guide body 22; and FIG. 5(d) is an enlarged view of the prisms 41 on the side opposite to the light source of the light guide body 22.

FIGS. 6(a) to 6(d) are schematic views illustrating a state of light travel in the region on the light source side of the light guide body 22 shown in FIG. 3. FIGS. 7(a) to 7(d) are schematic views illustrating a state of light travel in the region on the side opposite to the light source of the light guide body 22 shown in FIG. 3. FIGS. 8(a) and 8(b) and FIGS. 9(a) and 9(b)

illustrate a state of black floating (illumination distribution on the light receiving surface of the scanning sensor at a time of scanning black matt paper) and an illumination distribution on a scanned surface of a document, when an inclination angle $\theta_1$ and an inclination angle $\theta_2$, respectively, are changed, the inclination angle $\theta_1$ being of an inclined surface of the prism on the side opposite to the light source, the inclination angle $\theta_2$ being of an inclined surface of the prism on the light source side, as shown in FIGS. 6(a) and 7(a).

The prisms 41 are disposed at a constant interval along the entire longitudinal direction of the light guide body 22. The inclination angles of the inclined surfaces 41b on the side opposite to the light source and of the inclined surfaces 41c on the light source side of the prism are the same for all of the prisms 41. The width of the trough portions 44 in the longitudinal direction of the light guide body 22 is also constant.

The height of the prisms 41 is reduced in the regions on the light source side (regions I, II, and III in FIG. 3, for example), as shown in FIGS. 6(a) to 6(d). Specifically, the depth of the grooves between the prisms 41 is reduced (that is, the height of the prisms 41 in the light emitting direction is low). Accordingly, the proportion of the inclines surfaces 41b and 41c is reduced, and the proportion of the top surfaces 41a is increased. Thus, a probability of light entering the top surfaces 41a is increased, the light traveling in the light guide body 22 toward the side opposite to the light source.

The light entering (incident on) the top surface 41a is reflected by the top surface 41a (mainly due to total reflection) and travels to the side opposite to the light source, as shown in FIG. 6(a). When the incident angle relative to the top surface 41a is relatively large and the incident location relative to the top surface 41a is proximate to the inclined surface 41b on the side opposite to the light source, as shown in FIGS. 6(b) and 6(c), the light reflected by the top surface 41a is further reflected by the inclined surface 41b on the side opposite to the light source and travels toward the light emitting surface 32. The incident angle relative to the top surface 41a and the incident angle relative to the inclined surface 41b on the side opposite to the light source are different than each other in each state of FIGS. 6(b) and 6(c). Although the inclination angle α of the light reflected by the inclined surface 41b on the side opposite to the light source and the output angle β from the light emitting surface 32 are different depending on the incident angles, the light is emitted slightly inclined toward the side opposite to the light source.

As shown in FIG. 6(d), there is a case in which the light traveling in the light guide body 22 toward the side opposite to the light source is directly reflected by the inclined surface 41b on the side opposite to the light source without being reflected by the top surface 41a, and travels to the light emitting surface 32. In this case, a portion of the light extending toward the light emitting surface 32 is reflected; and the remaining portion of the light is not reflected by the inclined surface 41b on the side opposite to the light source, and travels inside the light guide body 22 toward the side opposite to the light source.

In the present embodiment, the angle $\theta_1$ of the inclined surface 41b on the side opposite to the light source is 45°. The critical angle of acrylic resin, which is a material of the light guide body 22, is approximately 45°. Thus, the light once reflected by the top surface 41a of the prism 41 and reaching the inclined surface 41b on the side opposite to the light source is totally reflected, since the incident angle relative to the inclined surface 41b on the side opposite to the light source exceeds the critical angle. The light traveling in parallel with the light guide body 22 is blocked by the prism 41 disposed further on the light source side. Thus, the light once reflected by the top surface 41a of the prism 41 and then reflected by the inclined surface 41b on the side opposite to the light source is dominant in the light travelling toward the light emitting surface 32 in the region on the light source side.

In the region on the light source side, the light traveling to the side opposite to the light source in the light guide body 22 is mainly reflected by the top surface 41a and travels to the side opposite to the light source, as shown in FIG. 6(a). In the region close to the light source (region I or II in FIG. 3), however, the proportion of the top surfaces 41a relative to the prisms 41 as a whole is set to be relatively large. As shown in FIG. 6(b), the probability is thus increased that the light is once reflected by the inclined surface 41b on the side opposite to the light source and travels in a direction substantially orthogonal to the longitudinal direction of the light guide body 22. Thereby, the main axis of the light emitted from the light guide body 22 is provided with a directivity approaching the direction orthogonal to the longitudinal direction of the light guide body 22 (prism height direction).

The angle conversion described above can be rephrased as below. Specifically, on the premise that the prisms 41 are disposed at an even pitch in the main scanning direction, the height of the prisms 41 is set to be low and the proportion of the top surfaces 41a of the prisms 41 is set to be large. Thereby, when an XZ plane is assumed which is defined by the main scanning direction (X axis) of the light guide body 22 and the height direction (Z axis) of the prisms 41, the main axis of the light emitted from the light emitting surface 32 is provided with the directivity approaching the direction orthogonal to the main scanning direction of the light guide body 22 (Z axis) on the XZ plane.

As shown in FIGS. 7(a) to 7(d), the height of the prism 41 is increased, specifically, the depth of the groove between the prisms 41 is deeper, in the region on the side opposite to the light source (regions IV, V, and VI in FIG. 3, for example). Accordingly, the proportion of the top surface 41a is reduced and the proportion of the inclined surfaces 41b and 41c is increased. Thus, the probability is increased that the light traveling in the light guide body 22 toward the side opposite to the light source enters the inclined surface 41b.

As shown in FIG. 7(a), the light having entered the inclined surface 41b on the side opposite to the light source passes through the inclined surface 41b on the side opposite to the light source and exits outside the light guide body 22. Then, the light passes through the inclined surface 41c on the light source side and returns into the light guide body 22. When the angle of the light returning into the light guide body 22 is angled away from the top surface 41a of the prism 41 (approaching the light emitting surface 32), the light is totally reflected by the inclined surface 41b on the side opposite to the light source and travels toward the light emitting surface 32. When the conditions above are met, the state of FIG. 7(a) is valid even when the incident angle relative to the inclined surface 41b on the side opposite to the light source is different. The inclination angle α of the light reflected by the inclined surface 41b on the side opposite to the light source and the output angle β from the light emitting surface change according to the incident angle.

As shown in FIG. 7(b), when the angle of the light once exiting to outside the light guide body 22, passing through the inclined surface 41c on the light source side, and returning into the light guide body 22 is an angle approaching the top surface 41a of the prism 41 (away from the light emitting surface 32), a portion of the light is reflected by the inclined surface 41b on the side opposite to the light source and travels toward the light emitting surface 32; and the remaining portion of the light is again emitted out of the light guide body 22, and enters the next prism 41 disposed on the side opposite to the light source. The light reflected by the inclined surface 41b on the side opposite to the light source is emitted at an angle inclined to the light source side from the light emitting surface 32.

As shown in FIG. 7(c), there is a case in which the light passing through the inclined surface 41c on the light source side and returning into the light guide body 22 enters (is incident on) the top surface 41a. In this case, the angle of the light reflected by the top surface 41a is angled away from the top surface 41a of the prism 41 (approaching the light emitting surface 32). Thus, the light is totally reflected by the inclined surface 41b on the side opposite to the light source and travels toward the light emitting surface 32. When the conditions above are met, the state of FIG. 7(c) is valid even when the incident angle relative to the inclined surface 41b on the side opposite to the light source is different. The inclination angle α of the light reflected by the inclined surface 41b on the side opposite to the light source and the output angle β from the light emitting surface change according to the incident angle.

As shown in FIG. 7(d), when the light directly enters the inclined surface 41b on the side opposite to the light source, similar to the case of FIG. 7(b), a portion of the light is reflected by the inclined surface 41b on the side opposite to the light source and travels toward the light emitting surface 32; and the remaining portion of the light exits outside the light guide body 22, and enters the next prism 41 on the side opposite to the light source. The light reflected by the inclined surface 41b on the side opposite to the light source is emitted at an angle inclined to the light source side from the light emitting surface 32.

The explanations above are related to the light traveling inside the light guide body 22 from the light source side to the side opposite to the light source. In the region on the side opposite to the light source, the light is returned by the mirror 27 (refer to FIG. 2) provided to the end portion on the side opposite to the light source (specifically, the light traveling inside the light guide body 22 from the side opposite to the light source towards the light side source). The returned light is also directed by the prism 41 to the light emitting surface 32. However, an output angle inclined toward the light source side is dominant in this case.

In the region on the side opposite to the light source, the light traveling inside the light guide body 22 toward the side opposite to the light source and the light returned by the mirror 27 and traveling toward the light source side are mixed. The main axis of the light emitted from the light guide body 22 is eventually provided with the directivity approaching the direction orthogonal to the longitudinal direction of the light guide body 22 (i.e., in the prism height direction).

In the examples of FIGS. 6(a) to 7(d), the inclination angle $\theta_1$ of the inclined surface 41b on the side opposite to the light source is 45°. It is preferable that the inclination angle $\theta_1$ of the inclined surface 41b on the side opposite be set within a range of 40° to 50°. Thereby, the intensity of the light can be increased in the region on the light source side, the light being sequentially reflected by the top surface 41a and the inclined surface 41b on the side opposite to the light source of the prism 41 and travels toward the direction substantially orthogonal to the longitudinal direction of the light guide body 22 (i.e., in the prism height direction).

Figure 8A:
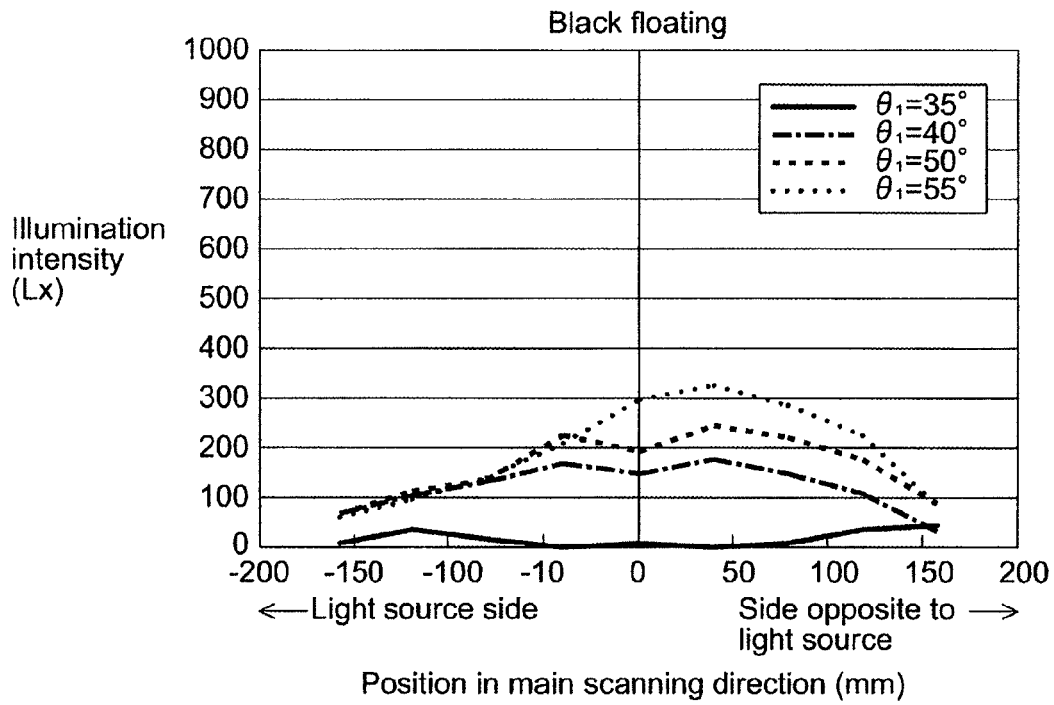
FIGS. 8(a) and 8(b) illustrate a state of black floating and an illumination distribution on a scanned surface of a document, when an inclination angle $\theta_1$ of an inclined surface on the side opposite to the light source is changed.

In a simulation performed within a range of 35° to 55° with respect to an appropriate angle of the inclination angle $\theta_1$ of the inclined surface 41b on the side opposite to the light source, it is demonstrated that, as shown in FIG. 8(a), the wider the inclination angle $\theta_1$ is, the greater the illumination intensity of the reflected light in the middle portion of the light guide body is, thus causing asymmetricity. It is appropriate that the inclination angle $\theta_1$ of the inclined surface 41b be 50° or less.

Figure 8B:
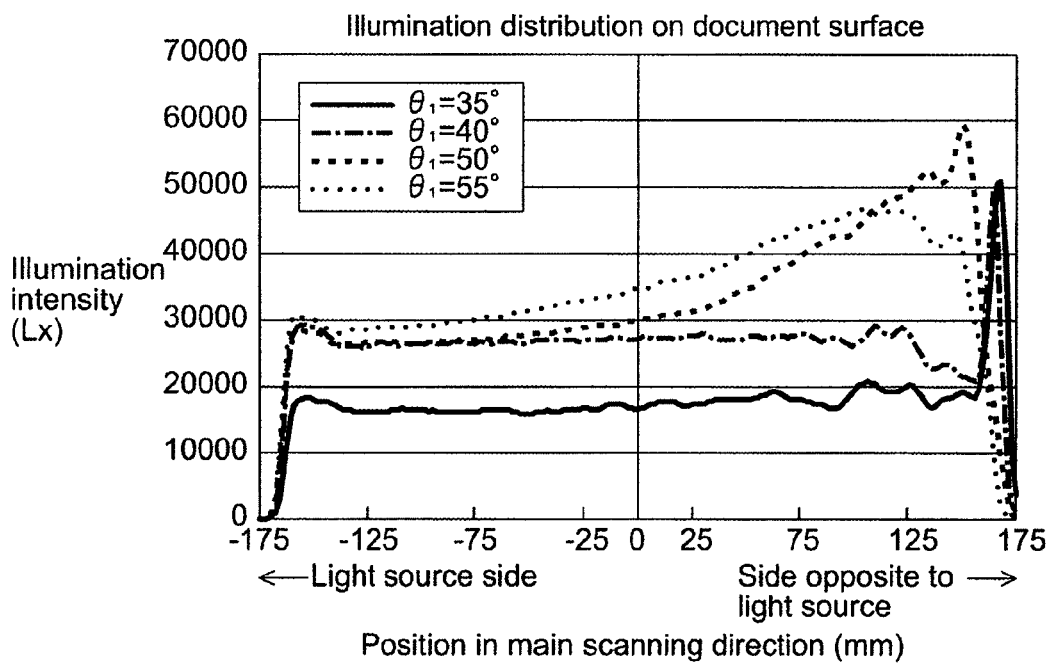

Further, as shown in FIG. 8(b), the narrower the inclination angle $\theta_1$ is, the lower the illumination intensity is on the document surface. It is appropriate that the inclination angle $\theta_1$ of the inclined surface 41b be 40° or greater.

When the inclination angle $\theta_1$ of the inclined surface 41b on the side opposite to the light source is greater than 50°, the inclination angle α of the reflected light to the inclined surface 41b on the side opposite to the light source is large, and the output angle β from the light emitting surface 32 cannot be sufficiently small. Conversely, when the inclination angle $\theta_1$ of the inclined surface 41b on the side opposite to the light source is less than 40°, the proportion of the light passing through the inclined surface 41b on the side opposite to the light source is high, and the light cannot be sufficiently reflected by the inclined surface 41b on the side opposite to the light source. Thus, it is preferable that the inclination angle $\theta 1$ of the inclined surface 41b on the side opposite to the light source be within a range of 40° to 50°.

In the example, the inclination angle $\theta_2$ of the inclined surface 41c on the light source side is 20°. It is preferable that the inclination angle $\theta_2$ of the inclined surface 41c on the light source side be set within a range of 15° to 25°. Thereby, the proportion of the light can be increased, the light passing through the inclined surface 41c on the light source side and returning inside the light guide body 22. Thus, the light efficiency is increased, and low power consumption can be achieved.

Figure 9A:
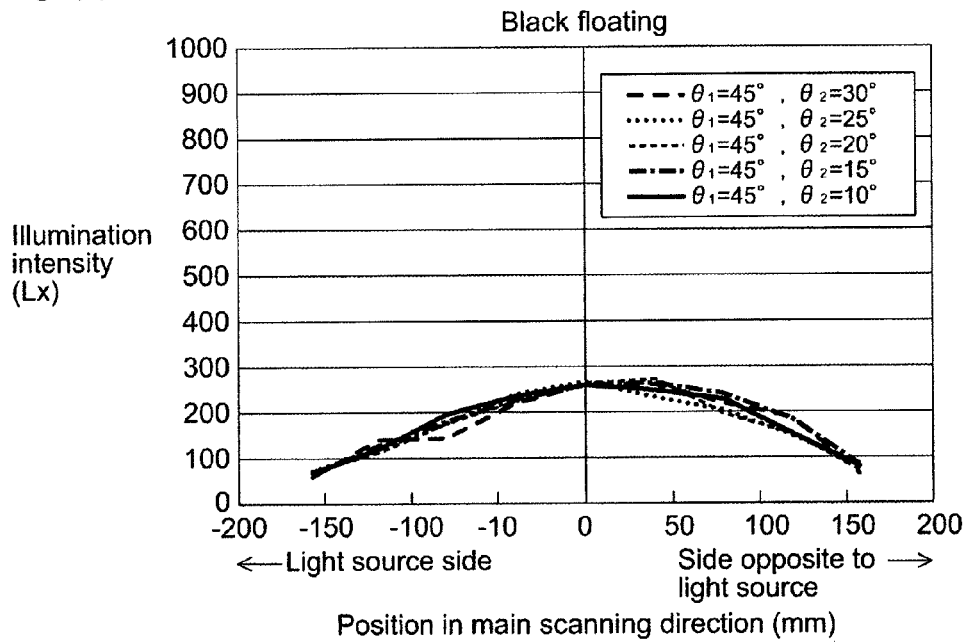
FIGS. 9(a) and 9(b) illustrate a state of black floating and an illumination distribution on a scanned surface of a document, when an inclination angle $\theta_2$ of an inclined surface on the light source side is changed.
Figure 9B:
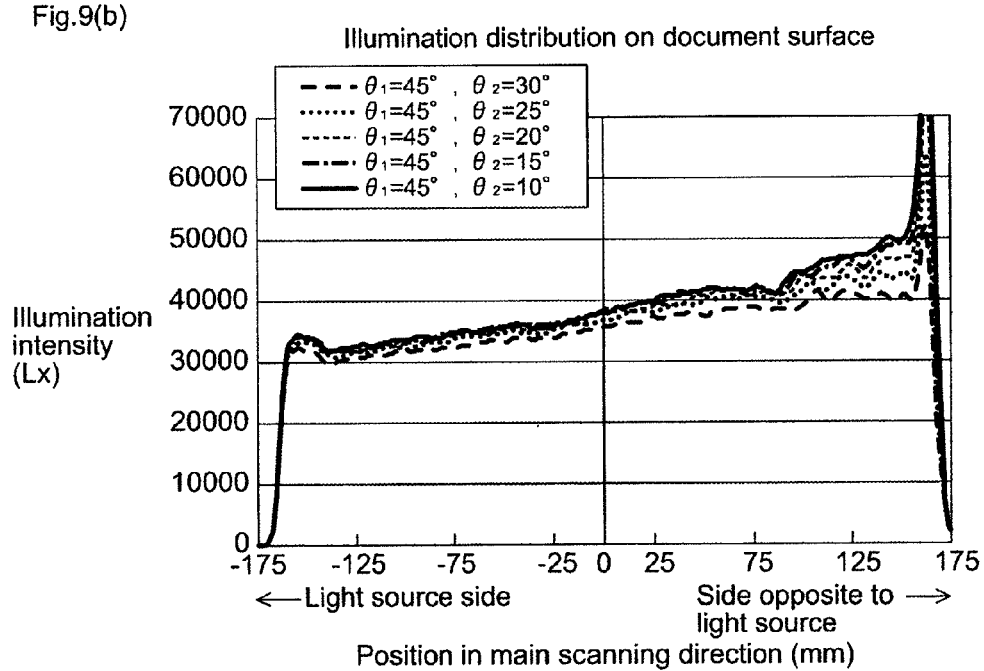

In a simulation performed within a range of 10° to 30° with respect to an appropriate angle of the inclination angle $\theta_2$ of the inclined surface 41c on the light source side, no change due to the angle of the inclination angle $\theta_2$ is observed in the illumination intensity of the reflected light in the middle portion of the light guide body, as shown in FIG. 9(a). As shown in FIG. 9(b), however, the smaller the inclination angle $\theta_2$ is, the higher the illumination intensity on the document surface is. It is thus demonstrated that 25° or less is appropriate for the inclination angle $\theta_2$ of the inclined surface 41c. When the inclination angle $\theta_2$ is extremely small, however, there is a possibility that a damage is caused when the prism 41 is removed from a mold during its production.

When the inclination angle $\theta_2$ of the inclined surface 41c on the light source side is greater than 25°, a higher proportion of the light passing through the inclined surface 41b on the side opposite to the light source is reflected by the inclined surface 41c on the light source side, and is not returned inside the light guide body 22. Thus, the emitted light amount from the light emitting surface 32 is decreased. Conversely, when the inclination angle $\theta_2$ of the inclined surface 41c on the light source side is excessively small, it is difficult to cause the light to travel toward the light emitting surface 32 by reflection at the inclined surface 41c on the light source side, the light being reflected by the mirror 27 provided to the end portion of the light guide body 22 on the side opposite to the light source and traveling inside the light guide body 22 toward the light source side. Thus, it is preferable that the inclination angle $\theta_2$ of the inclined surface 41c on the light source side be within a range of 15° to 25°.

In the example, the placement interval between the prisms 41 is constant. However, the placement interval between the prisms 41 may be changed according to the longitudinal position of the light guide body 22. Further, the inclination angles of the inclined surface 41b on the side opposite to the light source and of the inclined surface 41c on the light source side are all the same in the example. However, the inclination angles of the inclined surfaces 41b and 41c may be changed according to the longitudinal position of the light guide body 22.

Figure 10:
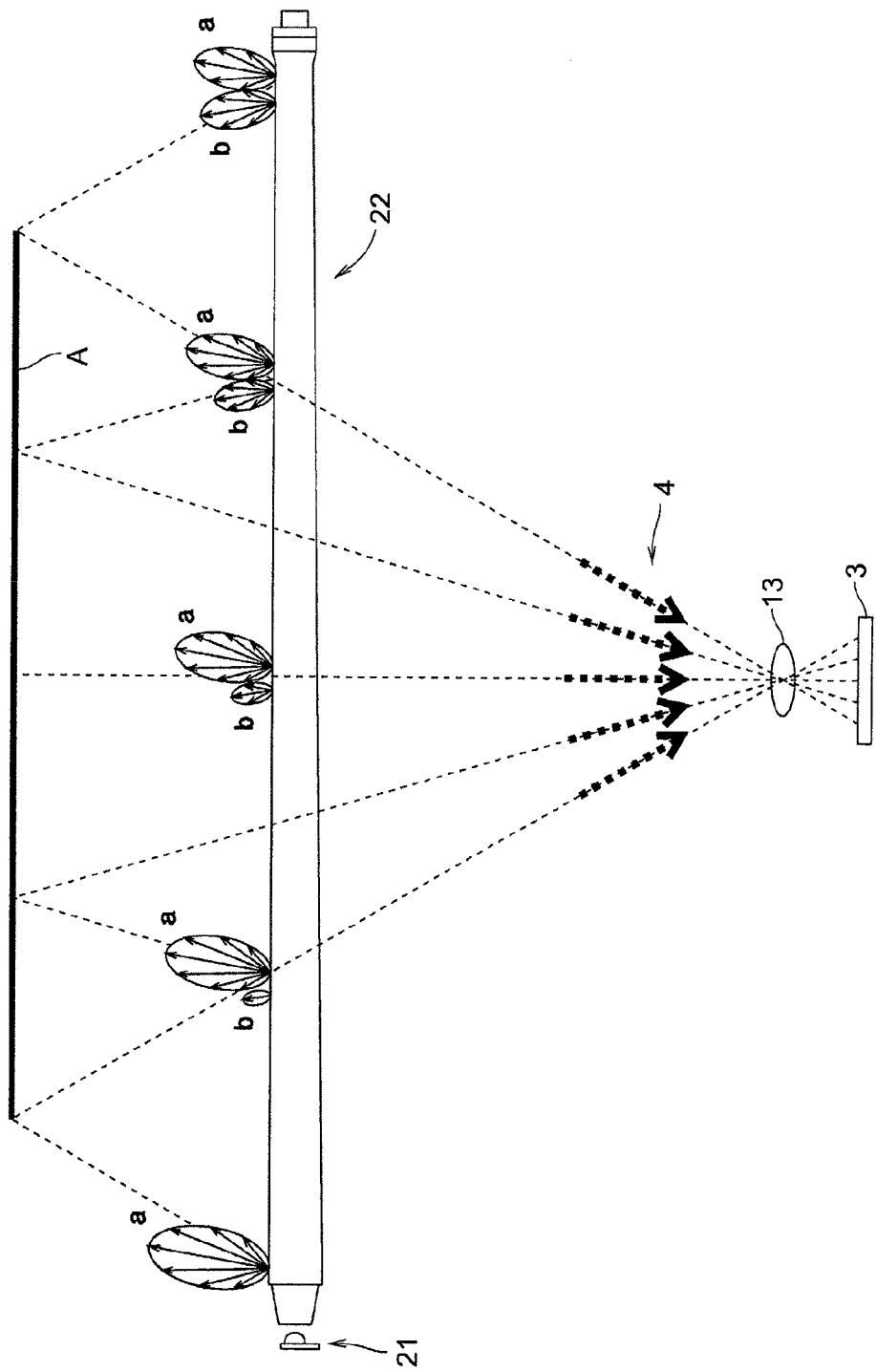
FIG. 10 is a schematic view illustrating a state of light emission from the light guide body and the light intensity of the optical reduction system in the lighting apparatus shown in FIG. 1.

FIG. 10 is a schematic view illustrating a state of light emission from the light guide body 22 and the light intensity of the optical reduction system 4 in the lighting apparatus 2 shown in FIG. 1. Light form light source, enters the light guide body, travels towards the side opposite to the light source, is reflected by the prism formed surface and is emitted at the light emitting surface ("a"). Further, the light reflected by the mirror provided at an end portion of the side opposite to the light source, travels within the light guide body towards the light source side, is reflected by the prism formed surface and is also emitted from the light emitting surface ("b"). In the lighting apparatus 2, the main axis of the light emitted from the light guide body 22 is provided with the directivity approaching the direction orthogonal to the longitudinal direction of the light guide body 22 (i.e., the prism height direction), as described above. In the region on the light source side, the light intensity is thus low in a direction coinciding with the field angle of the lens 13 included in the optical reduction system 4. Thereby, black floating is reduced in which an area partially having a low density appears on a scanned image.

Figure 11:
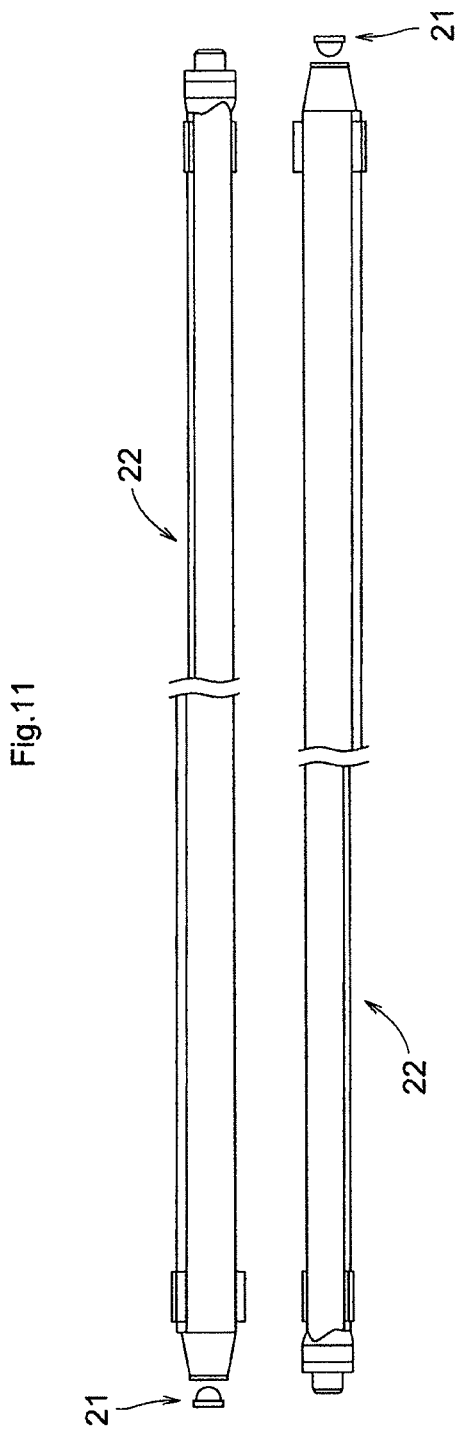
FIG. 11 is a plan view illustrating a modification of the lighting apparatus shown in FIG. 1.

FIG. 11 is a plan view illustrating a modification of the light guide body 22 of the lighting apparatus 2 shown in FIG. 1. FIG. 12 is a schematic view illustrating a state of light emission from the light guide body 22 and the light intensity of the optical reduction system 4 in the lighting apparatus shown in FIG. 11.

In the example, a pair of the light guiding bodies 22 are disposed so as to have the light source side and the side opposite to the light source of one light guide body in an opposite location with respect to the other light guide body. The light sources 21 are also disposed on the opposite sides according to the directions of the light guide bodies 22. Other components of the configuration are the same as those in the previous example (FIG. 1 to 7(d)). The same reference numerals are provided, and detailed explanations thereof are omitted.

With the configuration, even when the main axis direction of the light emitted from the light guide body 22 is somewhat deviated from the direction orthogonal to the longitudinal direction of the light guide body 22, the light emitted from the pair of light guiding bodies 22 is superimposed, and the properties of the light guiding bodies 22 are offset, as shown in FIG. 12. Light form light source, enters the light guide body, travels towards the side opposite to the light source, is reflected by the prism formed surface and is emitted at the light emitting surface ("a"). Further, the light reflected by the mirror provided at an end portion of the side opposite to the light source, travels within the light guide body towards the light source side, is reflected by the prism formed surface and is also emitted from the light emitting surface ("b"). Thus, the emitted light as a whole has the directivity in the direction orthogonal to the longitudinal direction of the light guide body as the main axis direction. Thereby, black floating can further be reduced.

In the example above, the configuration is provided in which scanning in the sub scanning direction is performed by feeding the document. A configuration may be employed in which scanning in the sub scanning direction is performed by moving the lighting apparatus and the mirror in the sub scanning direction relative to the document placed on the document glass.

In the previous example, the second reference surface 43 is composed of a plurality of planar surfaces, as shown in FIG. 3. The second reference surface 43 may, in the alternative, be composed of a substantially arcuate curved surface. Thereby, the illumination property of the light guide body 22 can be similar to a property opposite to the transmission property of the optical reduction system 4 at a high precision. Accordingly, the illumination distribution of the scanning sensor 3 can effectively be equalized at a higher precision.

Figure 13A:
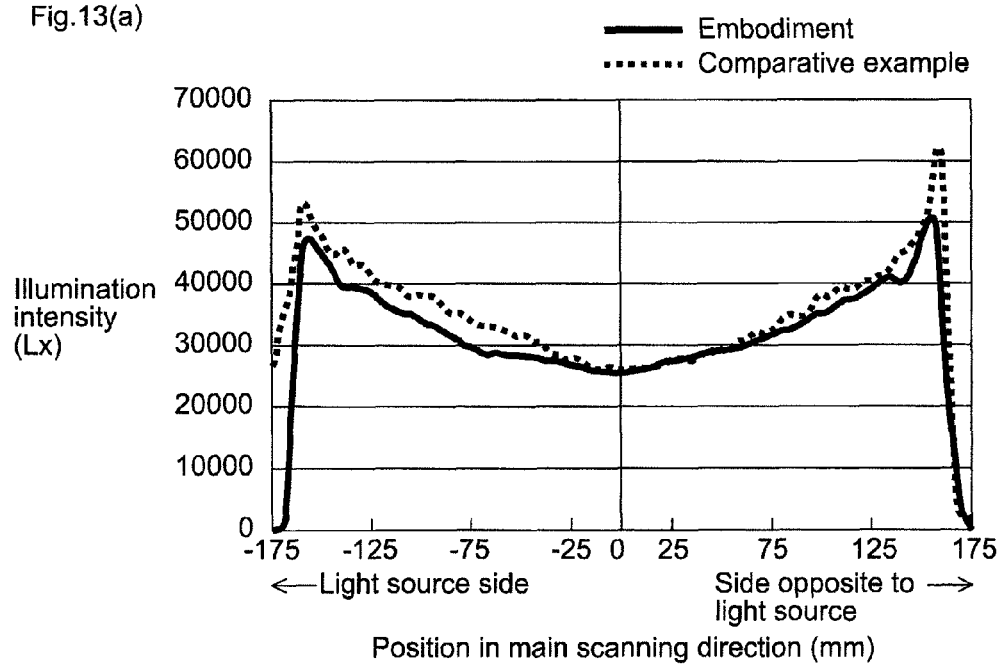
FIGS. 13(a) and 13(b) illustrate an illumination distribution on a scanned surface of a document and an illumination distribution on a light receiving surface of a scanning sensor in the embodiment and a comparative example.
Figure 13B:
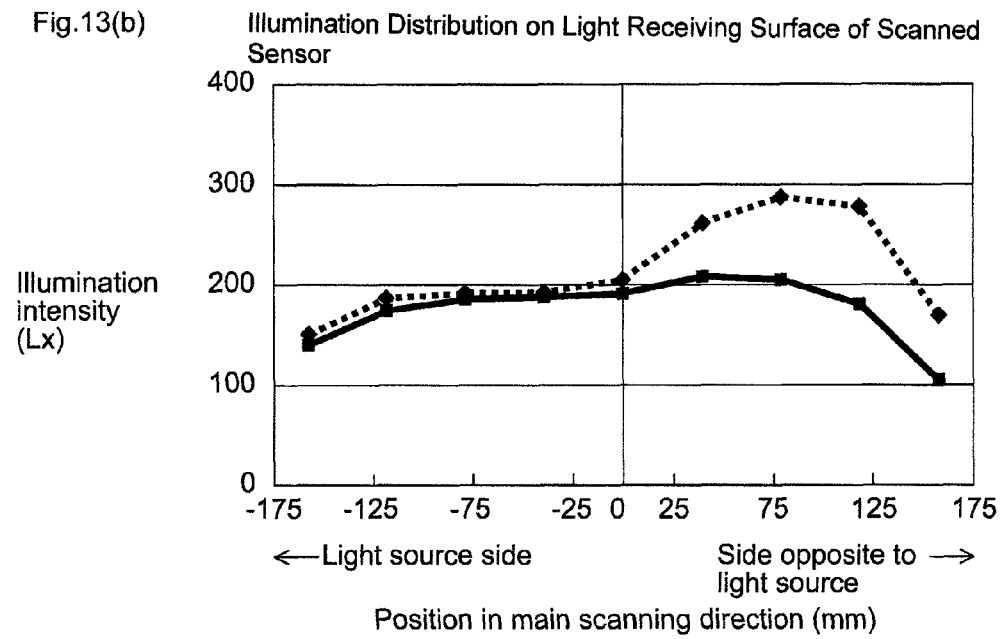

FIGS. 13(a) and 13(b) illustrate an illumination distribution on a scanned surface of a document and an illumination distribution on a light receiving surface of a scanning sensor in the embodiment and a comparative example. In the embodiment represented with a solid line in FIGS. 13(a) and 13(b), the light guide body having the configuration shown in FIG. 3 is used. In the comparative example of a conventional configuration, a light guide body is used in which a prism has substantially a triangle cross section, and an inclined angle $\theta_1$ of an inclined surface on a side opposite to a light source and an inclined angle $\theta_2$ of an inclined surface on a light source side are both 60°.

With respect to the illumination distribution on the scanned surface of the document A, the illumination intensity in the embodiment can be ensured at a similar level to the comparative example, as shown in FIG. 13(a). With respect to the illumination distribution on the light receiving surface of the scanning sensor 3, however, it is demonstrated that black floating in which the illumination intensity is high occurs in the region on the light source side in the comparative example, whereas the black floating on the light source region is eliminated in the embodiment, as shown in FIG. 13(b).

The light guide body according to the present invention and the lighting apparatus and the document scanning apparatus having the same have an effect in reducing black floating without increasing production cost. The present invention is effective as a light guide body, and a lighting apparatus and a document scanning apparatus having the same, the light guide body being provided with a prism formed surface longitudinally arrayed with a plurality of prisms and provided opposite to a light emitting surface, in order to allow light emitted from a light source to enter a light incident surface on a longitudinal end side and to be emitted from a longitudinally extending light emitting surface.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its various aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A light guide body comprising:
a prism formed surface provided opposite to a light emitting surface and having a longitudinally extending array of a plurality of prisms to allow light emitted from a light source to enter an end side of a light incident surface of the light guide body in the longitudinal direction and to be emitted from the longitudinally extending light emitting surface, wherein top surfaces and inclined surfaces of the prisms on a side opposite to the light source are configured, such that in a region of the light guide body on a light source side, the light traveling to the side opposite to the light source in the light guide body is sequentially reflected by the top surfaces and the inclined surfaces on the side opposite to the light source of the prisms, and is emitted from the light, emitting surface in a direction that approaches a direction orthogonal to the longitudinal direction of the light guide body, and wherein the prism formed surface has a configuration in which portions between adjacent prisms are positioned on a first reference surface, the first reference surface comprising a planar surface, the top surfaces of the prisms being positioned on a second reference surface, the top surfaces of the prisms positioned such that a distance from the first reference surface changes along the longitudinal direction of the light guide body, and the heights of the prisms, defined by a distance between the first reference surface and the second reference surface, changes according to a required illumination distribution property.

2. A light guide body comprising:
a prism formed surface provided opposite to a light emitting surface and having a longitudinally extending array of a plurality of prisms to allow light emitted from a light source to enter an end side of a light incident surface of the light guide body in the longitudinal direction and to be emitted from the longitudinally extending light emitting surface, wherein top surfaces and inclined surfaces of the prisms on a side opposite to the light source are configured, such that in a region of the light guide body on a light source side, the light traveling to the side opposite to the light source in the light guide body is sequentially reflected by the top surfaces and the inclined surfaces on the side opposite to the light source of the prisms, and is emitted from the light emitting surface in a direction that approaches a direction orthogonal to the longitudinal direction of the light guide body, and wherein the inclination angle of the inclined surfaces on the side opposite to the light source is 45°.

3. A light guide body comprising:
a prism formed surface provided opposite to a light emitting surface and having a longitudinally extending array of a plurality of prisms to allow light emitted from a light source to enter an end side of a light incident surface of the light guide body in the longitudinal direction and to be emitted from the longitudinally extending light emitting surface, wherein top surfaces and inclined surfaces of the prisms on a side opposite to the light source are configured, such that in a region of the light guide body on a light source side, the light traveling to the side opposite to the light source in the light guide body is sequentially reflected by the top surfaces and the inclined surfaces on the side opposite to the light source of the prisms, and is emitted from the light emitting surface in a direction that approaches a direction orthogonal to the longitudinal direction of the light guide body, wherein the inclined surfaces on the light source side of a prism are provided such that the light passing through the inclined surface on the side opposite to the light source passes through an inclined surface on the light source side in an adjacent prism and re-enters the light guide body, and wherein an inclination angle of the inclined surfaces on the light source side is within a range of 15° and 25°.

4. The light guide body according to claim 3, wherein the inclination angle of the inclined surfaces on the light source side is 20°.

5. The light guide body according to claim 1, wherein the prisms are disposed at an equal pitch in the longitudinal direction of the light guide body.

6. The light guide body according to claim 5, wherein each of the prisms has substantially a trapezoidal cross section.

7. The light guide body according to claim 6, wherein the top surfaces of the prisms have lengths, in the longitudinal direction of the light guide body, which are longest in a longitudinal central portion of the light guide body, and the lengths of the top surfaces of the prisms gradually are shorter from the central portion of the light guide body toward end portions on the light source side and the side opposite to the light source.

8. The light guide body according to claim 6, wherein the prisms have a height that is lowest in the longitudinally central portion of the light guide body, and gradually the height increases from the central portion toward the end portions on the light source side and the side opposite to the light source.

9. The light guide body according to claim 6, wherein a groove between the prisms has substantially a trapezoidal cross section.

10. The light guide body according to claim 9, wherein the portions between adjacent prisms comprises trough portions.

11. The light guide body according to claim 6, wherein a groove between the prisms has substantially a triangle cross section.

12. The light guide body according to claim 10, wherein the required illumination distribution property is defined by the cosine to the fourth law.

13. The light guide body according to claim 1, wherein a height of the light guide body, in a direction extending between the light emitting surface and the prism arranged surface, decreases along a direction extending between the light source side and the side opposite to the light source side.

14. The light guide body according to claim 1, wherein the second reference surface comprises a plurality of planar sections, and the heights of the prisms change along a direction from the light source side of the light guide body to the side opposite the light source side according to the required illumination distribution property.

15. A lighting apparatus comprising;
the light guide body according to claim 1;
a light source disposed on an end side in the longitudinal direction of the light guide body; and
a case integrally supporting the light source and the light guide body.

16. The lighting apparatus according to claim 15, wherein another light guide body is provided in parallel with the light guide body to comprise a pair of light guide bodies, and the pair of light guide bodies are disposed so as to have the light source side and the side opposite to the light source side of one light guide body opposite to the light source side and the side opposite the light source side of the another light guide body.

17. A document scanning apparatus comprising:
the lighting apparatus according to claim 15;

a scanning sensor receiving light reflected from a document and outputting an image signal; and an optical reduction system guiding the reflected light from the document to the scanning sensor.

* * * * *